(12) United States Patent
Shinozuka

(10) Patent No.: US 6,915,526 B2
(45) Date of Patent: Jul. 5, 2005

(54) OBJECT LENS DRIVING DEVICE AND OPTICAL HEAD HAVING THE SAME

(75) Inventor: Hiroshi Shinozuka, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 83 days.

(21) Appl. No.: 10/387,509

(22) Filed: Mar. 14, 2003

(65) Prior Publication Data

US 2003/0210641 A1 Nov. 13, 2003

(30) Foreign Application Priority Data

May 10, 2002 (JP) ........................................ 2002-135438

(51) Int. Cl.⁷ .......................... G11B 7/085; G11B 17/00
(52) U.S. Cl. ..................................... 720/672; 369/244.1
(58) Field of Search ....................... 720/672; 369/244.1, 369/247.1, 44.11–44.15, 44.18, 44.21

(56) References Cited

U.S. PATENT DOCUMENTS

| | | | | |
|---|---|---|---|---|
| 4,948,230 A | * | 8/1990 | Kasahara et al. | 359/823 |
| 6,181,670 B1 | * | 1/2001 | Nagasato | 369/244 |
| 6,625,105 B2 | * | 9/2003 | Suzuki et al. | 369/244 |
| 6,643,229 B1 | * | 11/2003 | Yamaguchi | 369/44.11 |
| 6,744,722 B2 | * | 6/2004 | Choi | 369/244 |

FOREIGN PATENT DOCUMENTS

| | | |
|---|---|---|
| CN | 1236946 | 12/1999 |
| JP | 7-182669 | 7/1995 |
| JP | 2000-36122 | 2/2000 |
| JP | 2000-222755 | 8/2000 |
| JP | 2001-014698 | 1/2001 |
| JP | 2001-110076 | 4/2001 |
| JP | 2003141760 A | * 5/2003 |
| JP | 2003257061 A | * 9/2003 |

OTHER PUBLICATIONS

Toshiba Review, http://www.toshiba.co.jp/tech/review/, Jul. 2002, No. 7, cover sheet and pp. 32–34.

Office Action from the Patent Office of the People's Republic of China, dated Sep. 17, 2004.

* cited by examiner

*Primary Examiner*—Allen Cao
(74) *Attorney, Agent, or Firm*—Pillsbury Winthop Shaw Pittman, LLP

(57) ABSTRACT

An object lens driving device comprises a movable unit which supports an object lens and is movably supported by a fixed unit, a first mechanism which has a first magnet affixed to a fixed unit and a first coil affixed to a movable unit, and drives the movable unit in a predetermined direction by supplying electricity to the first coil, and a second mechanism which has a second coil affixed to a fixed unit and a second magnet affixed to a movable unit, and drives the movable unit in a direction different from that of the first mechanism by supplying electricity to the second coil, wherein the first and second magnets are arranged so that their polarities have the same orientation.

8 Claims, 5 Drawing Sheets

OBJECT LENS DRIVING DEVICE AND OPTICAL HEAD HAVING THE SAME

CROSS-REFERENCE TO RELATED APPLICATIONS

This application is based upon and claims the benefit of priority from the prior Japanese Patent Application No. 2002-135438, filed May 10, 2002, the entire contents of which are incorporated herein by reference.

BACKGROUND OF THE INVENTION

1. Field of the Invention

The present invention relates to an object lens driving device which drives an object lens for focusing a light beam on an optical disk and recording or reproducing information, and an optical head having the same.

2. Description of the Related Art

It is well known that a driving device for recording or reproducing information into/from an optical disk such as a CD (Compact Disk), CD-RW (Rewritable), DVD (Digital Versatile Disk)-ROM (Read Only Memory) and DVD-RAM (Random Access Memory) has spread in recent years.

Such a driving device records or reproduces information into/from an optical disk by radiating a light beam from an optical head to the optical disk. In this case, an optical head uses an object lens to focus a light beam radiated from a light source on to a predetermined position on an optical disk.

Thus, an optical head is provided with an object lens driving device which comprises a focusing mechanism to control an object lens in the focusing direction, a tracking mechanism to control the object lens in the tracking direction, and a tilting mechanism to control the tilt of the object lens.

Each of the focusing mechanism, tracking mechanism and tilting mechanism of the object lens drive device adopts electromechanical conversion technology which moves the object lens by a predetermined distance in a predetermined direction by combining a coil and a magnet and controlling the electricity applied to the coil.

However, in current object lens driving devices, all the magnets and coils constituting each mechanism are mounted close to one another, and this structure raises a problem that the magnetic flux around the magnets constituting a focusing mechanism or a tracking mechanism, for example, affects the operation of the tilting mechanism.

BRIEF SUMMARY OF THE INVENTION

According to one aspect of the present invention, there is provided an object lens driving device comprising:

a fixed unit;

a movable unit configured to hold an object lens and to be movably supported by the fixed unit;

a first mechanism having a first magnet affixed to the fixed unit and a first coil affixed to the movable unit, and configured to drive the movable unit in a predetermined direction by supplying electricity to the first coil; and a second mechanism having a second coil affixed to the fixed unit and a second magnet affixed to the movable unit, and configured to drive the movable unit in a direction different from that of the first mechanism by supplying electricity to the second coil; wherein the first and second magnets are arranged so that their polarities have the same orientation.

According to another aspect of the present invention, there is provided an optical head comprising:

a light source;

an object lens configured to condense the light from the light source on a disk;

a movable unit configured to hold the object lens and to be movably supported by a fixed unit;

a first mechanism having a first magnet affixed to the movable unit and a first coil affixed to the fixed unit, and configured to drive the movable unit in a predetermined direction by supplying electricity to the first coil; and a second mechanism having a second coil affixed to the movable unit and a second magnet affixed to the fixed unit, and configured to drive the movable unit in a direction different from that of the first mechanism by supplying electricity to the second coil; wherein the first and second magnets are arranged so that their polarities have the same orientation.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Figure 1:
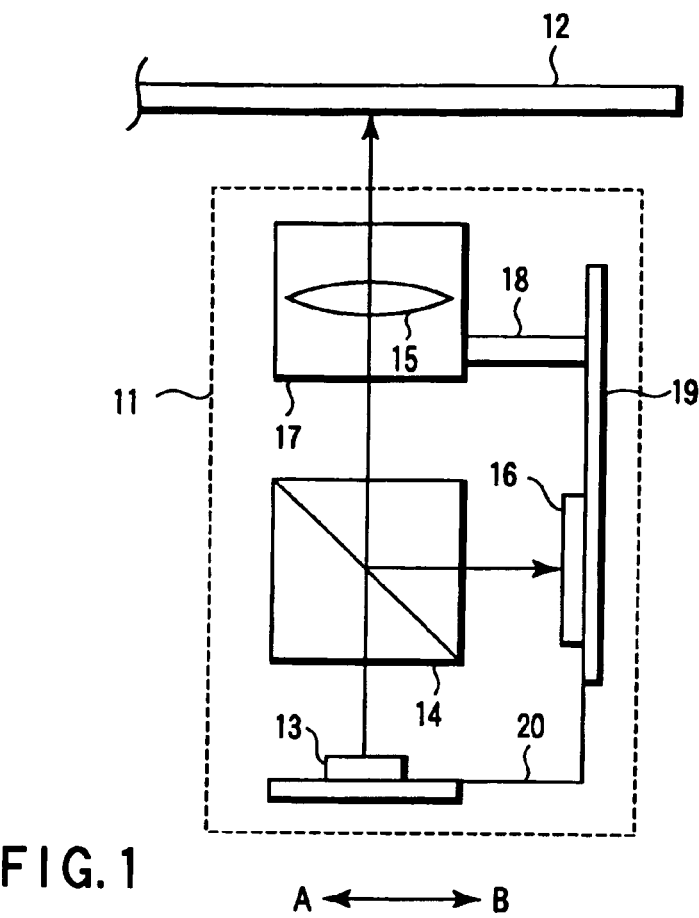
FIG. 1 is a block diagram showing the optical head of an embodiment of the present invention.

Hereinafter, one embodiment of the present invention will be explained in detail with reference to the accompanied drawings. FIG. 1 shows the optical head 11 explained in this embodiment. The optical head 11 is faced to the optical disk 12 and supported movably in the radial direction, i.e., in the directions of arrows A and B.

The optical head 11 can record information in the optical disk 12 by focusing a laser beam, which is radiated from a light source or a semiconductor laser 13 and modulated according to the information to be recorded, on the optical disk 12, through an optical system 14 and an object lens 15.

The optical head 11 also focuses a laser beam of a certain level radiated from the semiconductor laser 13 on the optical disk 12 through the optical system 14 and object lens 15, and causes the laser beam reflected from the optical disk 12 to return through the object lens 15 and to be refracted by the optical system 14 and received by an opto-electric converter 16, thereby reproducing the information from the optical disk 12.

Here, the object lens 15 is supported by an object lens driving device 17 so that the focus, track and tilt can be controlled. Each coil described later to control the focus, track and tilt of the object lens 15 is connected to a printed circuit board 19 through a flexible printed circuit board 18.

The semiconductor laser 13 is also connected to the printed circuit board 19 through a flexible printed circuit board 20. Further, the opto-electric converter 16 is electrically and mechanically connected to the printed circuit board 19.

The optical head 11 is electrically externally connected through the printed circuit board 19, and controls the semiconductor laser 13 and object lens driving device 17, and extracts the signal generated by the opto-electric converter 16.

Figure 2:
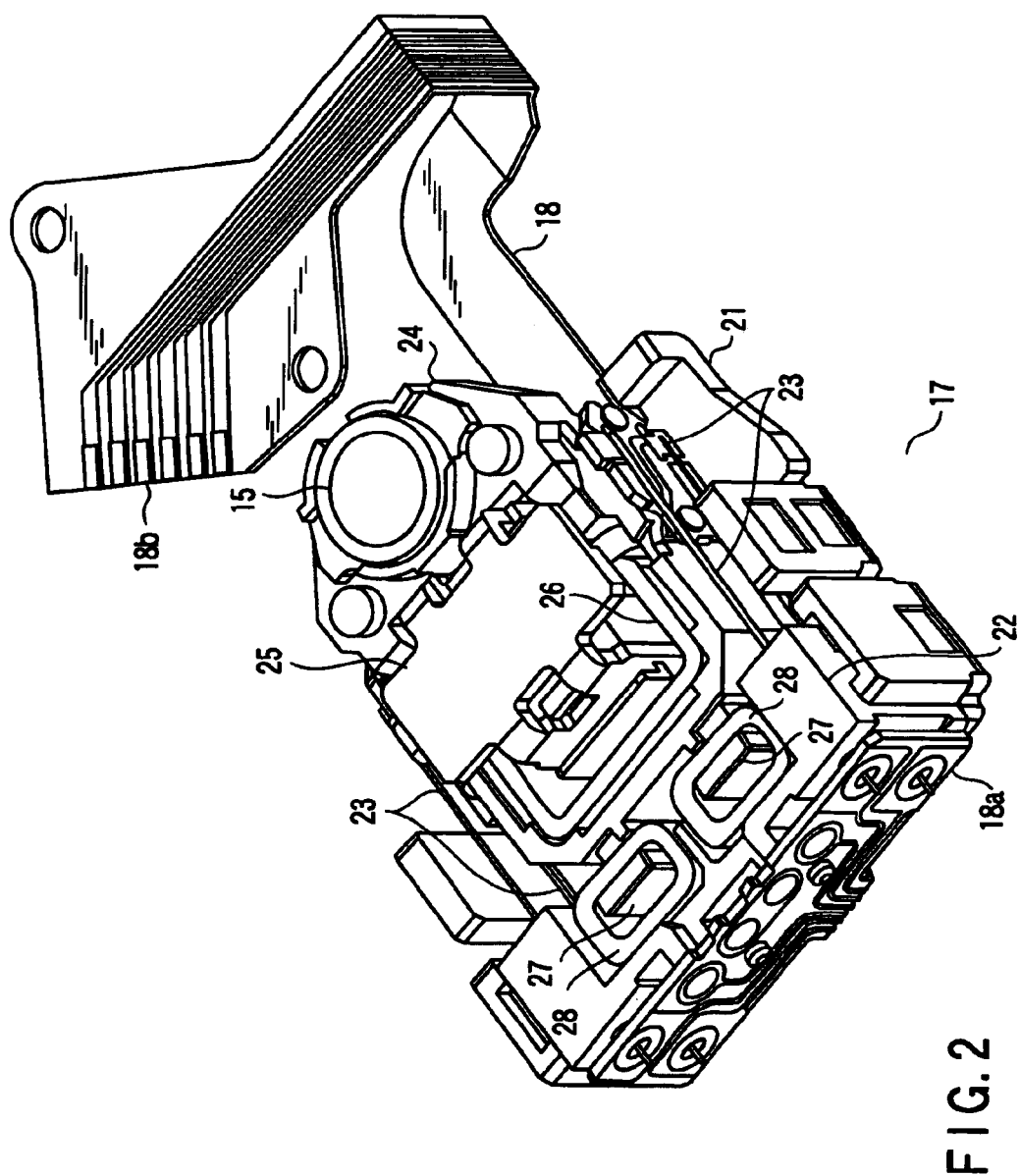
FIG. 2 is a perspective view of an object lens driving device of the same embodiment.
Figure 3:
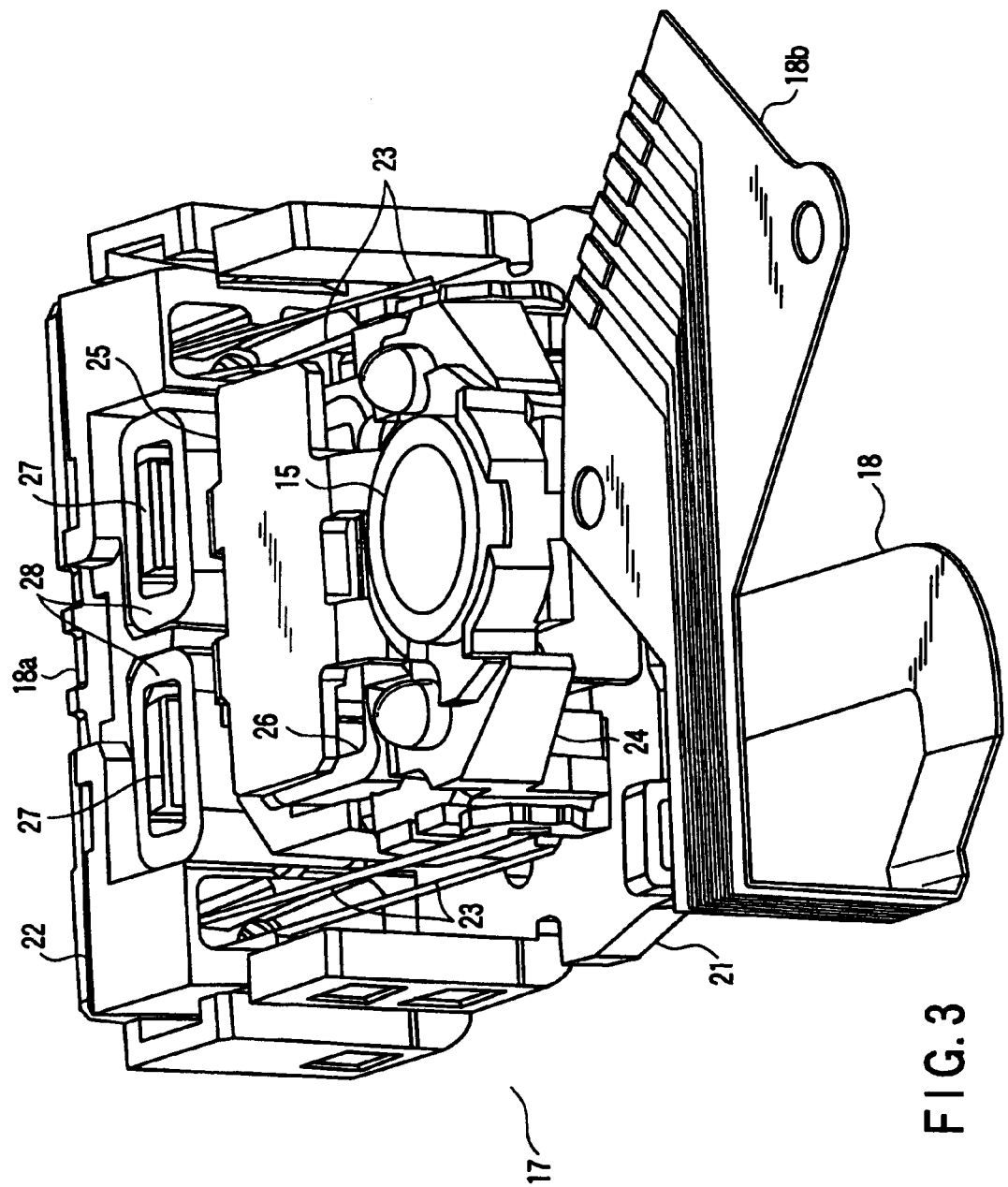
FIG. 3 is a perspective view of the object lens driving device of the same embodiment from another angle.
Figure 4:
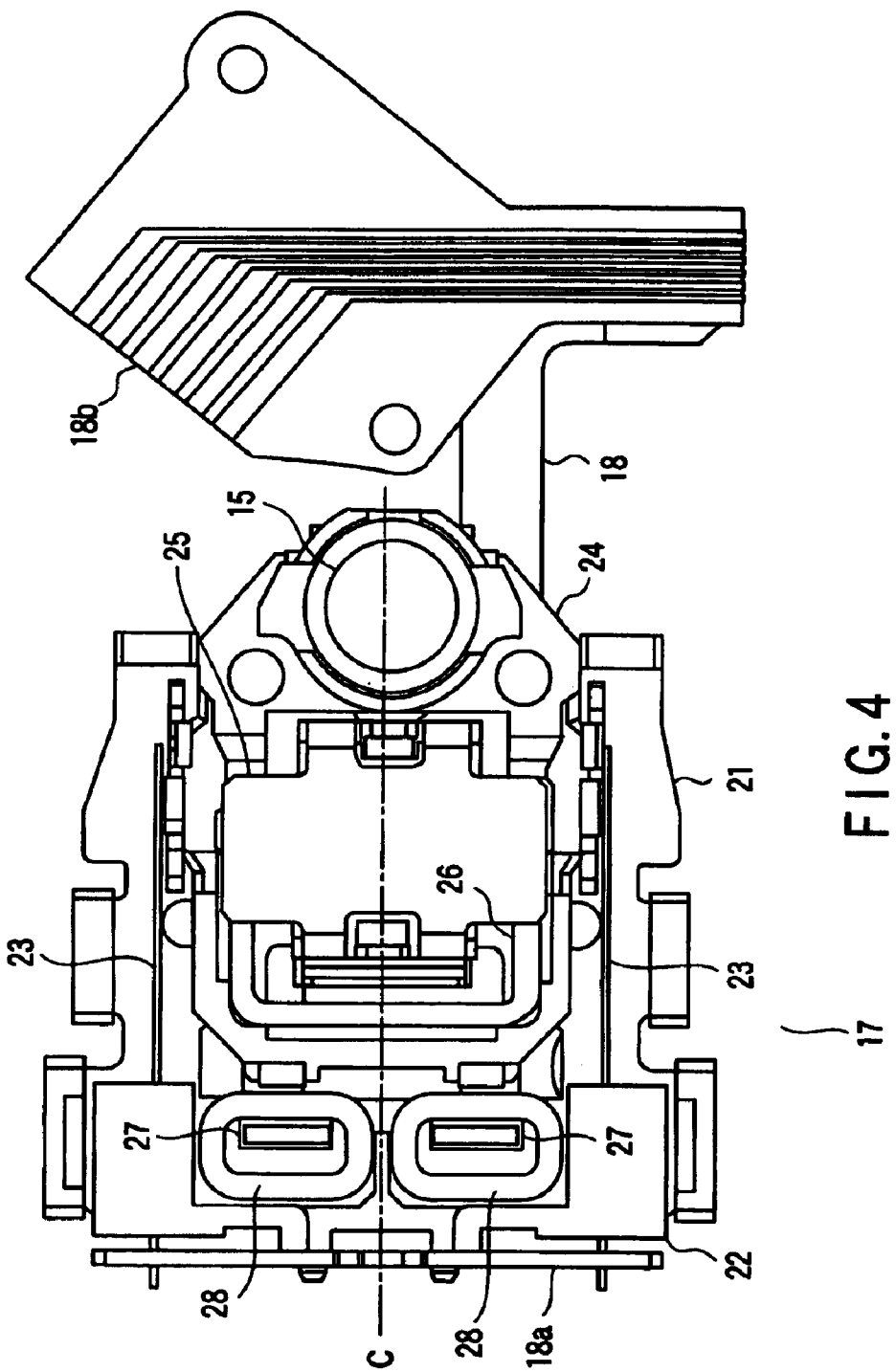
FIG. 4 is a plan view from above the object lens driving device of the same embodiment.

FIG. 2 shows an external view of the object lens driving device 17. FIG. 3 shows an external view of the object lens driving device 17 viewed from a different angle from FIG. 2. FIG. 4 shows the top view of the object lens driving device 17.

In FIG. 2 to FIG. 4, a reference numeral 21 indicates a base, which is a fixed unit. A wire holder 22 is fixed to one end of the base 21. To the wire holder 22, four wires 23 made of an elastic conductive material and formed like a bar are supported so that they are arranged substantially square against a tangent of the optical disk 12.

Fixed also to one end of the base 21 is one end 18a of the flexible printed circuit board 18. One end of each wire 23 is electrically connected to the one end 18a of the flexible printed circuit board 18, penetrating through the wire holder 22. The other end 18b of the flexible printed circuit board 18 is connected to the printed circuit board 19.

Here, each wire 23 supports at the other end a lens holder 24 which is a movable unit. The lens holder 24 supports the object lens 15. With this structure, the object lens 15 is supported against the base 21 by the elastic force of the wire 23, so that the focusing direction, tracking direction and tilt can be controlled.

Supported on the base 21 is a pair of magnets (not shown in FIG. 2 to FIG. 4) shared by a focusing mechanism to drive the object lens 15 in the focusing direction, and a tracking mechanism to drive the object lens 15 in the tracking direction.

The pair of magnets is surrounded by the yoke fixed to the base 21 (not shown in FIG. 2 to FIG. 4), forming a magnetic field parallel to each other. The yoke is opened at one end, and the opening is covered by a lid 25.

The lens holder 24 supports a focus coil 26 constituting the focusing mechanism and a tracking coil constituting the tracking mechanism (not shown in FIG. 2 to FIG. 4).

The focus coil 26 and tracking coil are partially exposed in the above-mentioned parallel magnetic field. The focus coil 26 and tracking coil can generate a driving force in the focusing and tracking directions with respect to the lens holder 24, by controlling the amount and direction of current.

On the other hand, two magnets 27 which constitute the tilting mechanism to control the tilt of the object lens 15 are affixed to the lens holder 24. These magnets 27 are provided symmetrically side by side on both sides of the tangent C of the optical disk 12 passing through the center of the object lens 15 (see FIG. 4).

These magnets 27 forms a parallel magnetic field through the above-mentioned yoke between the pair of magnets shared by the focusing mechanism and the tracking mechanism.

Further, tilt coils 28 constituting the tilting mechanism are supported on the base 21 just like surrounding the two magnets 27. These tilt coils 28 surround the magnets 27 so that the winding axes coincide with the focusing direction.

By controlling the amount and direction of the current to flow the tilt coils 28, the tilt coils 28 control the tilt of the object lens 15 with respect to the magnets 27 of the lens holder 24. Namely, the tilt coils 28 can generate a driving force to turn the object lens 15 around the tangent C.

Figure 5:
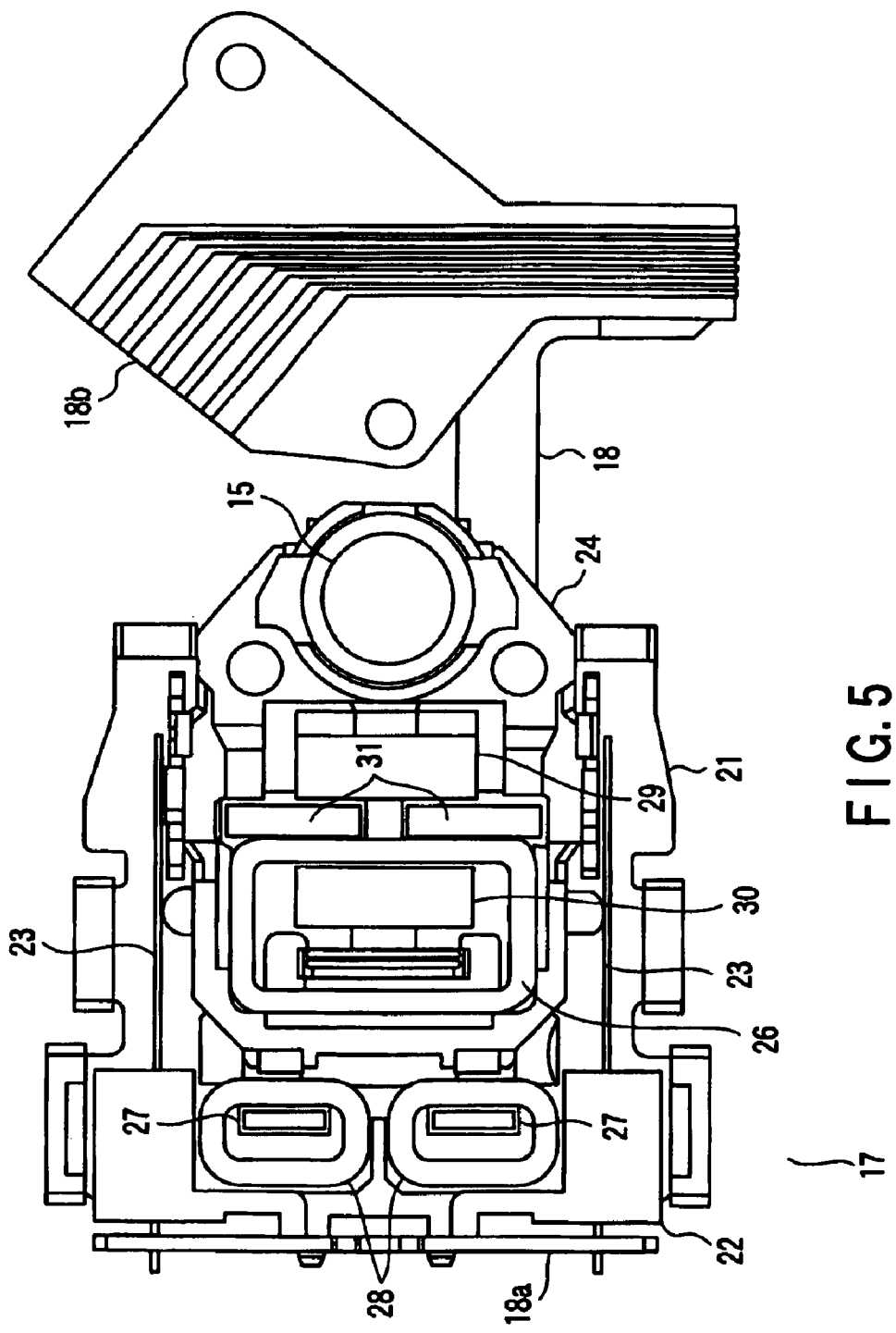
FIG. 5 is a plan view of the object lens diving device of the same embodiment, with the lid removed.

FIG. 5 shows the state with the lid 25 removed. That is, in FIG. 5, a pair of magnets 29 and 30 shared by the focusing mechanism and the tracking mechanism are separated by a certain space and oppositely provided on the base 21, along the tangent of the optical disk 12.

Between these pair of magnets 29 and 30, a pair of the above-mentioned tracking coils 31 supported by the lens holder 24 are interposed in such a manner that they are arranged side by side in the tracking direction. Further, the focus coil 26 supported by the lens holder 24 surrounds the magnet 30.

The tilt coil 28 is directly connected to one end 18a of the flexible printed circuit board 18, and is energized. The focus coil 26 and tracking coil 31 are connected to one end 18a of the flexible printed circuit board 18 through a wire 23, and are energized.

Figure 6:
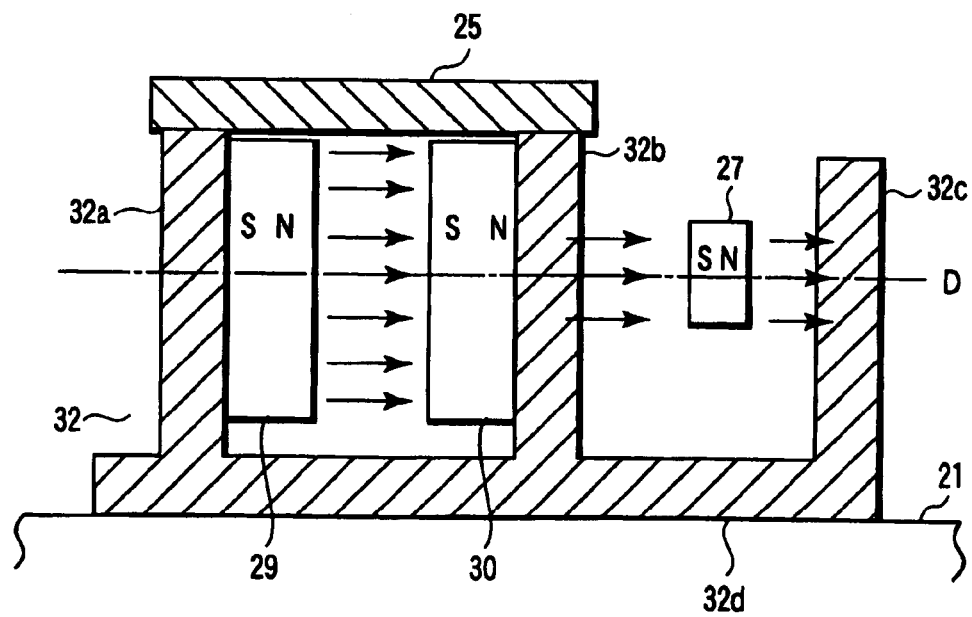
FIG. 6 is a sectional view for explaining the relation between each magnet, yoke and lid of the object lens driving device in the same embodiment.

FIG. 6 shows the relation between the magnets 27, 29, 30, yoke 32 and lid 25 in the object lens driving device 17. That is, the magnets 27, 29, 30 are arranged in the order of 29, 30, 27 from the nearest to the object lens 15 along the tangent of the optical disk 12, so that their polarities have the same orientation.

The yoke 32 is made of a magnetic material and is formed in one body with a yoke wall 32a located in the side of the magnet 29 opposite to the magnet 30 or the S-pole side of the magnet 29, a yoke wall 32b located in the side of the magnet 30 opposite to the magnet 29 or the N-pole side of the magnet 30, a yoke wall 32c located in the side of the magnet 28 opposite to the magnet 30 or the N-pole side of the magnet 27, and a yoke magnetic path 32d connecting the yoke walls 32a, 32b and 32c.

The open end opposite to the side where the yoke magnetic path 32d is formed by the yoke walls 32a and 32b, is covered by the lid 25 forming a closed magnetic path.

The yoke magnetic path 32d of the yoke 32 is fixed to the base 21. As indicated by dashed line D in FIG. 6, the magnets 29, 30, 27 are arranged so that their centers in the height direction from the base 21 are substantially aligned.

In the above-mentioned embodiment, the pair of magnets 29, 30 shared by the focusing mechanism and tracking mechanism are supported by the base 21 which is the fixed unit, and the magnet 27 constituting the tilting mechanism is supported by the lens holder 24 which is the movable unit, and the magnets 29, 30, 27 are arranged along the tangent of the optical disk 12 so that their polarities have the same orientation.

Thus, it is possible to continuously form a stable parallel magnetic flux space between the magnets 29, 30 and 27. This prevents the operation of the tilting mechanism from being affected by the magnetic flux around the magnets 29 and 30 constituting the focusing mechanism and tracking mechanism, for example.

Further, since a magnetic circuit with a closed magnetic path is formed by surrounding the magnets 29 and 30 which is the fixed unit by the yoke walls 32a, 32b of the yoke 32, the yoke magnetic path 32d and the lid 25, it is possible to form a stable parallel magnetic field between the magnets 29 and 30 without being influenced by the fluctuation in the magnetic field due to movement of the magnet 27, which is the movable unit.

Contrarily, by making a closed magnetic path, an extra magnetic field generated by the magnets 29 and 30 does not leak to the outside. This prevents movable unit influencing the magnet 27, and minimizes the effect on the tilting mechanism.

Since the centers of the magnets 29, 30 and 27 in the height direction as measured from the base 21 are substantially aligned, the height of the lens holder 24 can be held constant by the pulling force of both magnets.

In the above-mentioned embodiment, the pair of magnets 29 and 30 constituting the focusing mechanism and tracking mechanism are supported by the base 21, which is the fixed unit, and the magnet 27 constituting the tilting mechanism is supported by the lens holder 24, which is the movable unit. Contrarily, it is also possible to support the pair of magnets 29 and 30 constituting the focusing mechanism and tracking mechanism by the lens holder 24, which is the movable unit, and to support the magnet 27 constituting the tilting mechanism by the base 21, which is the fixed unit.

In this case, the focus coil 26 and tracking coil 31 are supported by the base 21, which is the fixed unit, and the tilt coil 28 is supported by the lens holder 24, which is the movable unit.

Further, the tilt coils 28 can surround the magnet 27 so that their winding axes become orthogonal to the focusing direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An object lens driving device comprising:
   a fixed unit including:
      (i) a yoke having first and second yoke walls, which are substantially parallel to each other, and a yoke magnetic path connecting one end of the first yoke wall and one end of the second yoke wall, and
      (ii) a lid configured to cover an open end formed by another end of the first yoke wall and another end of the second yoke wall:
   a movable unit configured to hold an object lens and to be movably supported by the fixed unit;
   a tracking mechanism having a first magnet affixed to the first yoke wall and a first coil affixed to the movable unit, the tracking mechanism being configured to drive the movable unit in a tracking direction by supplying electricity to the first coil;
   a focusing mechanism having a second magnet affixed to the second yoke wall and a second coil affixed to the movable unit, the focusing mechanism being configured to drive the movable unit in a focusing direction by supplying electricity to the second coil, wherein the first and second yoke walls, the yoke magnetic path, and the lid constitute a magnetic circuit of a closed magnetic path and the first and second magnets are provided inside the closed magnetic path; and
   a tilting mechanism having a third coil affixed to the fixed unit and a third magnet affixed to the movable unit, the tilting mechanism being configured to tilt the movable unit by supplying electricity to the third coil,
   wherein the polarities of the first to third magnets have substantially the same orientation, and have substantially the same orientation with the direction orthogonal to the tracking direction and the focusing direction, respectively.

2. The object lens driving device according to claim 1, wherein the first and second magnets are arranged so that their centers are substantially aligned.

3. The object lens driving device according to claim 1, wherein the third coil constituting the tilting mechanism is arranged so that the winding axis direction substantially coincides with the focusing direction.

4. The object lens driving device according to claim 1, wherein the third coil constituting the tilting mechanism is arranged so that the winding axis direction is substantially orthogonal to the focusing direction.

5. An optical head comprising:
   a light source;
   a fixed unit including:
      (i) a yoke having first and second yoke walls, which are substantially in parallel to each other, and a yoke magnetic path connecting one end of the first yoke wall and one end of the second yoke wall, and
      (ii) a lid configured to cover an open end formed by another end of the first yoke wall and another end of the second yoke wall;
   a movable unit configured to hold the object lens and to be movably supported by the fixed unit;
   a tracking mechanism having a first magnet affixed to the first yoke wall and a first coil affixed to the movable unit, the tracking mechanism being configured to drive the movable unit in a tracking direction by supplying electricity to the first coil;
   a focusing mechanism having a second magnet affixed to the second yoke wall and a second coil affixed to the movable unit and being configured to drive the movable unit in focusing direction by supplying electricity to the second coil; and
   a tilting mechanism having a third coil affixed to the fixed unit and a second magnet affixed to the movable unit, and the tilting mechanism being configured to tilt the movable unit by supplying electricity to the third coil,
   wherein the polarities of the first to third magnets have substantially the same orientation, and substantially coincide with direction of tangent of the disk, respectively.

6. The optical head according to claim 5, wherein the first and second magnets are arranged so that their centers are substantially aligned.

7. The optical head according to claim 5, wherein the third coil constituting the tilting mechanism is arranged so that the winding axis direction substantially coincides with the focusing direction.

8. The optical head according to claim 5, wherein the third coil constituting the tilting mechanism is arranged so that the winding axis direction is substantially orthogonal to the focusing direction.

* * * * *